(12) United States Patent
Weinberg et al.

(10) Patent No.: US 12,735,049 B2
(45) Date of Patent: Sep. 15, 2026

(54) SYSTEM AND METHOD OF DRIVING RANGE ESTIMATION BASED ON A TORQUE INPUT AND VEHICLE INCLUDING THE SAME

(71) Applicant: GM GLOBAL TECHNOLOGY OPERATIONS LLC, Detroit, MI (US)

(72) Inventors: Richard B. Weinberg, Highland, MI (US); Nhat Minh Nguyen, Ypsilanti, MI (US); Jacob A. McGivern, White Lake, MI (US); Michael Sporkin, Chicago, IL (US); Eagle Yuan, Oxford (GB)

(73) Assignee: GM Global Technology Operations LLC, Detroit, MI (US)

( * ) Notice: Subject to any disclaimer, the term of this patent is extended or adjusted under 35 U.S.C. 154(b) by 43 days.

(21) Appl. No.: 18/829,515

(22) Filed: Sep. 10, 2024

(65) Prior Publication Data

US 2026/0070565 A1 Mar. 12, 2026

(51) Int. Cl.
*B60W 40/107* (2012.01)

(52) U.S. Cl.
CPC ..... *B60W 40/107* (2013.01); *B60W 2520/105* (2013.01); *B60W 2556/10* (2020.02)

(58) Field of Classification Search
CPC ......... B60W 40/107; B60W 2520/105; B60W 2556/10
See application file for complete search history.

(56) References Cited

U.S. PATENT DOCUMENTS

2002/0109402 A1* 8/2002 Nakamura .......... B60T 8/17552 303/146
2013/0073113 A1* 3/2013 Wang ..................... B60W 20/11 701/1
2016/0375782 A1* 12/2016 Liu ......................... B60L 58/12 320/109
2020/0031371 A1* 1/2020 Soliman ................ B60W 10/04
2020/0354000 A1* 11/2020 Gammack ............. B62D 35/02
2021/0178911 A1* 6/2021 Gammack .............. B60L 50/60
(Continued)

*Primary Examiner* — Wade Miles
*Assistant Examiner* — James Brian Chin
(74) *Attorney, Agent, or Firm* — Quinn IP Law

(57) ABSTRACT

A method of driving range estimation includes: receiving a first signal indicating a shift of the vehicle out of park; calculating a torque-to-acceleration ratio of the vehicle based on a measured acceleration of the vehicle and a measured torque of the vehicle once driving begins; comparing the calculated torque-to-acceleration ratio at the measured acceleration to average torque-to-acceleration ratios for the vehicle; determining whether the calculated torque-to-acceleration ratio is included in the average torque-to-acceleration ratios stored in the memory; determining a new energy efficiency estimation based on the torque-to-acceleration ratios that are closest to the calculated torque-to-acceleration ratio when the calculated torque-to-acceleration ratio is not included in the average torque-to-acceleration ratios; calculating the driving range estimation based on one of the existing energy efficiency estimation and the new energy efficiency estimation; displaying the driving range estimation; updating the driving range estimation displayed while driving; and storing the new energy efficiency associated.

20 Claims, 2 Drawing Sheets

(56) References Cited

U.S. PATENT DOCUMENTS

2021/0188372 A1* 6/2021 Gammack ............ B62D 35/001
2021/0206446 A1* 7/2021 Araki ....................... B60G 3/20
2025/0128715 A1* 4/2025 Park ...................... B60W 40/08

* cited by examiner

SYSTEM AND METHOD OF DRIVING RANGE ESTIMATION BASED ON A TORQUE INPUT AND VEHICLE INCLUDING THE SAME

INTRODUCTION

The concepts described herein relate generally to vehicles including driving range estimation systems, and a method of driving range estimation based on a relationship between vehicle torque and vehicle acceleration.

Range estimation systems can be included in vehicles powered by, for example an internal combustion propulsion system, an electric propulsion system, and/or a hybrid-electric propulsion system that combines both internal combustion propulsion and electric propulsion.

Driving range estimation systems are operable to calculate the estimated driving range that a vehicle can travel before the vehicle exhausts its fuel/energy supply.

In the case of a vehicle that is powered by an internal combustion (IC) propulsion system, the fuel supply is a volume of fuel, e.g. gasoline or diesel, contained within a fuel tank. In the case of an electric vehicle (EV) that is powered by an electric propulsion system, the fuel supply is an amount of energy available in a rechargeable energy storage system (RESS) before the RESS will need to be recharged. In the case of a hybrid-electric vehicle (HEV) that is powered by a combination of IC and electric propulsion systems, the fuel supply includes the volume of fuel in gallons contained within the fuel tank, and the amount of energy in kWh available in the RESS.

Driving range estimation systems calculate an estimated driving range based upon the fuel/energy supply available at a given point in time and an average fuel/energy consumption or an instant fuel/energy consumption, each of which are measured in miles per gallon (MPG), and/or miles per gallon equivalent (MPGe), which is equal to 0.029669 MkWh.

A fuel/energy efficiency estimation, i.e., distance in miles and/or km per unit of fuel in gallons and/or energy in kWh, consumed at a point in time, is used in conjunction with the amount of fuel/energy available at that same point in time t, to determine a driving range estimation (DRE at that same point in time.

As the average fuel/energy consumption is calculated during operation of the vehicle, a driving range estimation displayed by a range estimation system when the vehicle is initially shifted out of park does not account for factors, such as vehicle loading, whether or not the vehicle is pulling a trailer, and/or a weight of a load within the trailer, or the like, which may have changed subsequent to the last time the vehicle was driven, resulting in the driving range estimation being inaccurate.

SUMMARY

In view of the above discussion, it is useful to develop a method of driving range estimation that uses an energy efficiency estimation to adjust the driving range estimation based on a torque input when a vehicle is initially shifted out of park and driving begins to account for factors such as vehicle loading and/or unloading, whether or not the vehicle is pulling a trailer, and/or a weight of a load within the vehicle and/or the trailer, which may result in the initial and subsequent driving range estimations being more accurate.

A method of driving range estimation that uses an energy efficiency estimation to adjust the driving range estimation based on an input torque when a vehicle is initially shifted out of park may include: receiving, via a controller, a first signal indicating a shift of the vehicle out of park; calculating, via the controller, a torque-to-acceleration ratio of the vehicle based on a measured acceleration of the vehicle and a measured torque of the vehicle when the vehicle is shifted out of park and driving begins; comparing, via the controller, the calculated torque-to-acceleration ratio at the measured acceleration to average torque-to-acceleration ratios for the vehicle, wherein the average torque-to-acceleration ratios are stored within a memory that is in communication with the controller; determining, via the controller, whether the calculated torque-to-acceleration ratio is included in the average torque-to-acceleration ratios stored in the memory; selecting, via the controller, an existing energy efficiency estimation associated with the calculated torque-to-acceleration ratio when the calculated torque-to-acceleration ratio is included in the average torque-to-acceleration ratios stored in the memory; calculating, via the controller, a new energy efficiency estimation based on the average torque-to-acceleration ratios closest to the calculated torque-to-acceleration ratio when the calculated torque-to-acceleration ratio is not included in the average torque-to-acceleration ratios stored in the memory; determining, via the controller, the driving range estimation based on one of the existing energy efficiency estimation and the new energy efficiency estimation; updating, via the controller, the driving range estimation displayed to a customer, e.g., a driver, while driving; and storing, via the controller, the new energy efficiency estimation calculated while driving within the memory, wherein the new energy efficiency estimation calculated is continuously updated while driving, and stored within the memory until a second signal indicating a shift into park is received by the controller.

The driving range estimation may be determined based on the existing energy efficiency estimation selected when the calculated torque-to-acceleration ratio is included in the average torque-to-acceleration ratios for the vehicle, while the driving range estimation may be determined based on the new energy efficiency estimation calculated when the calculated torque-to-acceleration ratio is not included in the average torque-to-acceleration ratios for the vehicle.

According to one aspect of the disclosure, the average torque-to-acceleration ratios may be based on calibration data stored in the memory, and/or calculated based on historic drive cycle averages and stored in the memory.

The existing energy efficiency estimation may be selected from energy efficiency estimations stored in the memory, and/or associated with the average torque-to-acceleration ratios stored in the memory. At least a first subset of the energy efficiency estimations may be based on calibration data.

The new energy efficiency estimation may be associated with the calculated torque-to-acceleration ratio, when the calculated torque-to-acceleration ratio is not included in the average torque-to-acceleration ratios stored in the memory and may be stored as one of the energy efficiency estimations.

The acceleration of the vehicle may be received from a first sensor of the plurality of sensors, in communication with the controller, while the torque may be received from a second sensor of the plurality of sensors, in communication with the controller.

According to one aspect of the disclosure, a control system for a vehicle may include: a plurality of sensors; and a controller in communication with the plurality of sensors.

The controller may be operable to receive a first signal indicating a shift of the vehicle out of park; calculate a torque-to-acceleration ratio of the vehicle based on a measured acceleration of the vehicle and a measured torque of the vehicle when the vehicle is shifted out of park and driving begins; compare the calculated torque-to-acceleration ratio at the measured acceleration to average torque-to-acceleration ratios for the vehicle, wherein the average torque-to-acceleration ratios are stored within a memory that is in communication with the controller; determine whether the calculated torque-to-acceleration ratio is included in the average torque-to-acceleration ratios stored in the memory; select an existing energy efficiency estimation associated with the calculated torque-to-acceleration ratio when the calculated torque-to-acceleration ratio is included in the average torque-to-acceleration ratios stored in the memory; calculate a new energy efficiency estimation based on the average torque-to-acceleration ratios closest to the calculated torque-to-acceleration ratio when the calculated torque-to-acceleration ratio is not included in the average torque-to-acceleration ratios stored in the memory; determine the driving range estimation based on one of the existing energy efficiency estimation and the new energy efficiency estimation; update the driving range estimation displayed to a customer while driving; and store the new energy efficiency estimation calculated while driving within the memory.

The new energy efficiency estimation calculated may be continuously updated while driving, and stored within the memory until a second signal indicating a shift into park is received by the controller.

The driving range estimation may be determined based on the existing energy efficiency estimation selected when the calculated torque-to-acceleration ratio is included in the average torque-to-acceleration ratios for the vehicle, while the driving range estimation may be determined based on the new energy efficiency estimation calculated when the calculated torque-to-acceleration ratio is not included in the average torque-to-acceleration ratios for the vehicle.

The existing energy efficiency estimation may be selected from energy efficiency estimations stored in the memory and may be associated with the average torque-to-acceleration ratios stored in the memory.

At least a first subset of the energy efficiency estimations may be based on calibration data.

The new energy efficiency estimation may be associated with the calculated torque-to-acceleration ratio, when the calculated torque-to-acceleration ratio is not included in the average torque-to-acceleration ratios stored in the memory.

The new energy efficiency estimation may be stored as one of the energy efficiency estimations.

A vehicle may include a powertrain configured to generate a torque for propulsion of the vehicle; a plurality of sensors configured to sense a shift, measure the torque of the vehicle, and measure an acceleration of the vehicle; a display configured to display information, for example but not limited to a driving range estimation, to a customer, e.g., a driver, and a controller, in communication with the plurality of sensors and the display.

The controller may be configured to receive a first signal indicating a shift of the vehicle out of park; calculate a torque-to-acceleration ratio of the vehicle based on a measured acceleration of the vehicle and a measured torque of the vehicle when the vehicle is shifted out of park and driving begins; compare the calculated torque-to-acceleration ratio at the measured acceleration to average torque-to-acceleration ratios for the vehicle, wherein the average torque-to-acceleration ratios are stored within a memory that is in communication with the controller; determine whether the calculated torque-to-acceleration ratio is included in the average torque-to-acceleration ratios stored in the memory; select an existing energy efficiency estimation associated with the calculated torque-to-acceleration ratio when the calculated torque-to-acceleration ratio is included in the average torque-to-acceleration ratios stored in the memory; calculate a new energy efficiency estimation based on the average torque-to-acceleration ratios closest to the calculated torque-to-acceleration ratio when the calculated torque-to-acceleration ratio is not included in the average torque-to-acceleration ratios stored in the memory; determine the driving range estimation based on one of the existing energy efficiency estimation and the new energy efficiency estimation; update the driving range estimation displayed to a customer while driving; and store the new energy efficiency estimation calculated while driving within the memory.

The new energy efficiency estimation calculated may be continuously updated while driving, and stored within the memory until a second signal indicating a shift into park is received by the controller.

The driving range estimation may be determined based on the existing energy efficiency estimation selected when the calculated torque-to-acceleration ratio is included in the average torque-to-acceleration ratios for the vehicle, while the driving range estimation may be determined based on the new energy efficiency estimation calculated when the calculated torque-to-acceleration ratio is not included in the average torque-to-acceleration ratios for the vehicle.

The existing energy efficiency estimation may be selected from energy efficiency estimations stored in the memory, while the new energy efficiency estimation may be associated with the calculated torque-to-acceleration ratio, when the calculated torque-to-acceleration ratio is not included in the average torque-to-acceleration ratios stored in the memory.

The powertrain may include, for example but not limited to, an internal combustion engine, and/or an electric propulsion system.

By providing a method of driving range estimation that uses an energy efficiency estimation to adjust the driving range estimation based on a torque input when a vehicle is initially shifted out of park and driving begins, and incorporating the method into a control system for a vehicle, factors such as vehicle loading and/or unloading, whether or not the vehicle is pulling a trailer, and/or a weight of a load within the vehicle and/or the trailer may be accounted for resulting in the initial and subsequent driving range estimations being more accurate.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

BRIEF DESCRIPTION OF THE DRAWINGS

The accompanying drawings, which are incorporated into and constitute a part of this specification, illustrate implementations of the disclosure which, taken together with the description, serve to explain the principles of the disclosure.

Figure 1:
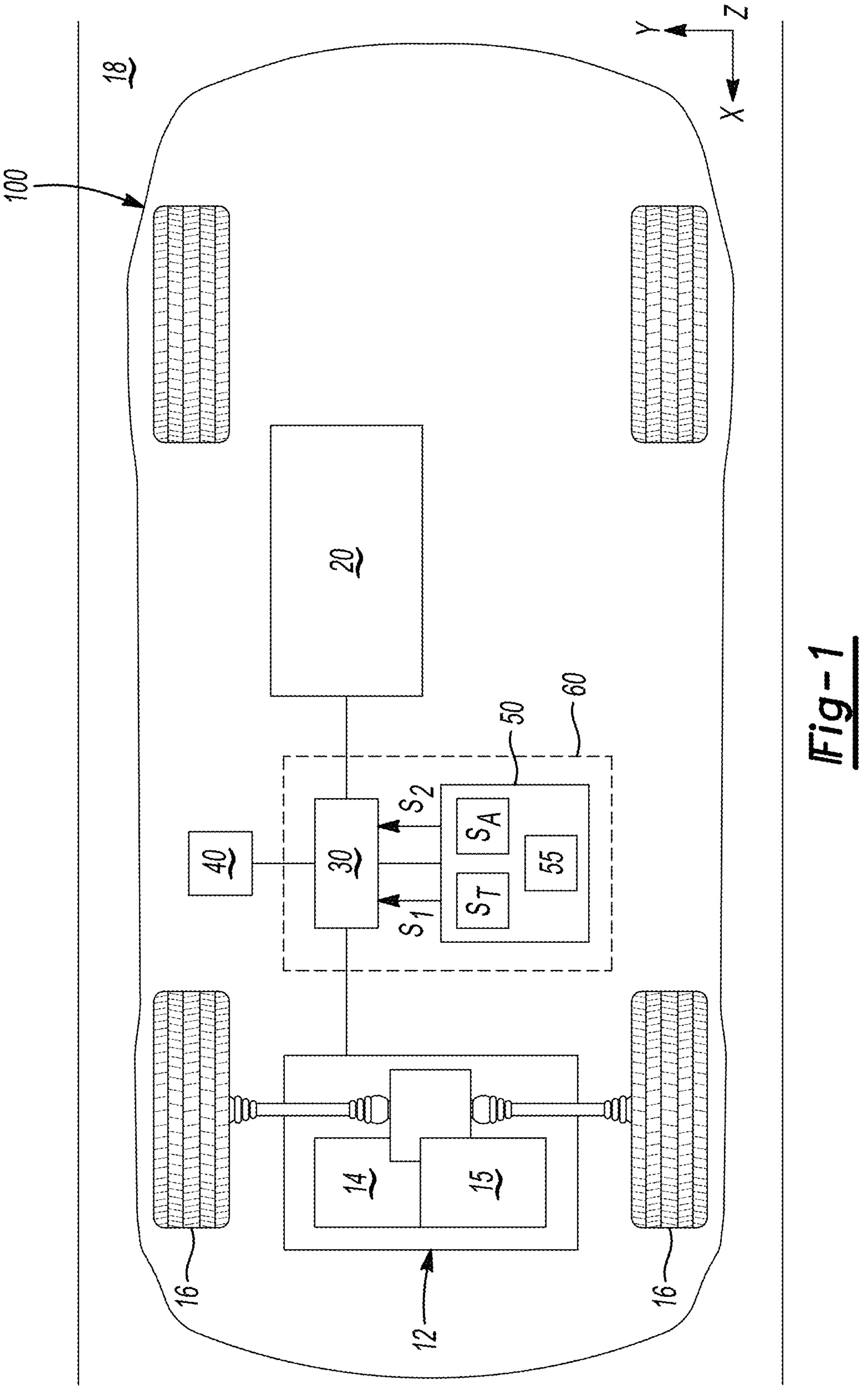
FIG. 1 is a schematic illustration of a vehicle including both an internal combustion engine and an electric propulsion system according to the present disclosure.

The appended drawings are not necessarily to scale and may present a somewhat simplified representation of various preferred features of the present disclosure as disclosed herein, including, for example, specific dimensions, orientations, locations, and shapes. Details adjacent to such features will be determined in part by the intended application and use environment.

DETAILED DESCRIPTION

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including," "containing," "comprising," "having," and the like shall mean "including without limitation." Moreover, words of approximation such as "about," "almost," "substantially," "generally," "approximately," etc., may be used herein in the sense of "at, near, or nearly at," or "within 0-5% of," or "within acceptable manufacturing tolerances," or logical combinations thereof.

Referring now to the drawings, wherein like numerals indicate like parts in several views, a method of driving range estimation that uses an energy efficiency estimation to adjust the driving range estimation based on a torque input when a vehicle is initially shifted out of park and driving begins, and a control system and a vehicle including a controller configured accordingly, are shown and described herein.

As illustrated in FIG. 1, a vehicle 100 includes a powertrain 12. The vehicle 100 may include, but is not limited to, a commercial vehicle, an industrial vehicle, a passenger vehicle, an aircraft, a watercraft, a train or the like.

The powertrain 12 includes a power-source 14 configured to generate a power-source torque T (not shown) for propulsion of the vehicle 100 via driven wheels 16 relative to a road surface 18. The power-source 14 is depicted as an electric motor-generator.

As further illustrated in FIG. 1, the powertrain 12 may also include an additional power-source 15, for example but not limited to, an internal combustion engine or a fuel cell. The power-sources 14 and 15 may act in concert to power the vehicle 100.

The vehicle 100 includes a rechargeable energy storage system (RESS) 20, a controller 30, and a display 40.

The RESS 20 is configured to store electrical power through heat-producing electro-chemical reactions and discharge DC power for energizing the vehicle 100 during use and/or to power a structure, for example, but not limited to a house, during a power disruption or outage.

The controller 30 is in communication with the powertrain 12, the RESS 20, the display 40, and a plurality of sensors 50 including, for example but not limited to, a torque sensor $S_T$ and an acceleration sensor $S_A$. The controller 30 is programmable and may include a central processing unit (CPU) that regulates various functions of the vehicle 100, the RESS 20, the display 40, and/or the plurality of sensors 50.

In either of the above configurations, the controller 30 includes a processor and tangible, non-transitory memory 55, which includes instructions for operation of vehicle 100, the RESS 20, the display 40, and the plurality of sensors 50 programmed therein. The memory 55 may be an appropriate recordable medium that participates in providing computer-readable data or process instructions. Such a recordable medium may take many forms, including, but not limited to, non-volatile media and volatile media.

Non-volatile media for the controller 30 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer, or via a wireless connection.

Memory 55 of the controller 30 may also include a flexible disk, hard disk, magnetic tape, another magnetic medium, a CD-ROM, DVD, another optical medium, etc. The controller 30 may be configured or equipped with other required computer hardware, such as a high-speed clock, requisite Analog-to-Digital (A/D) and/or Digital-to-Analog (D/A) circuitry, input/output circuitry and devices (I/O), as well as appropriate signal conditioning and/or buffer circuitry. Algorithms required by the controller 30 or accessible thereby, including, but not limited to predictive algorithms, may be stored in the memory 55 and automatically executed to provide the required functionality of the vehicle 100, the RESS 20, the display 40, and the plurality of sensors 50.

The controller 30 is disposed in the vehicle 100 and is in communication with the powertrain 12, the RESS 20, the display 40, the plurality of sensors 50, and the vehicle 100.

Figure 2:
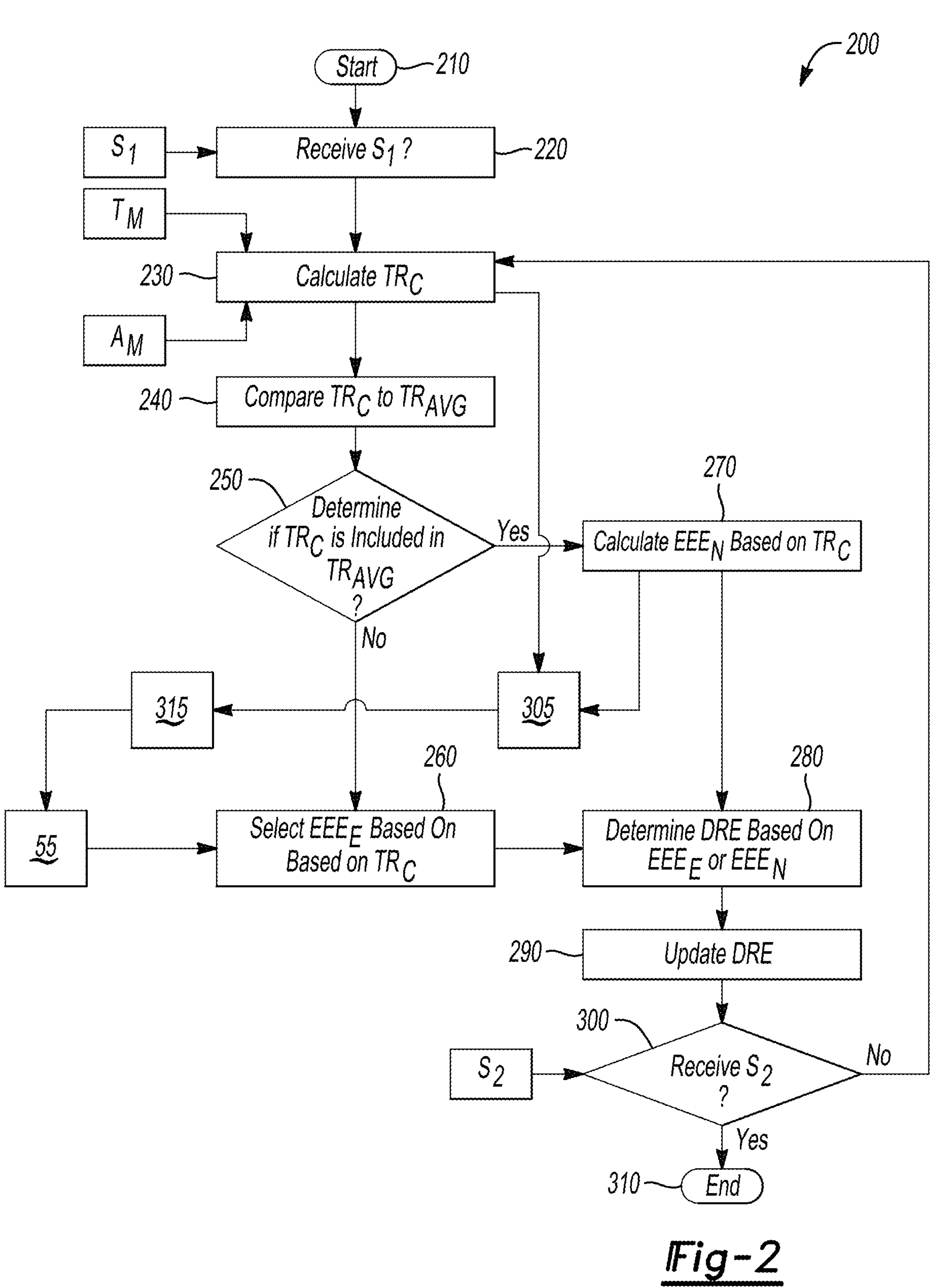
FIG. 2 is a flow chart illustrating a method of driving range estimation for a vehicle according to the present disclosure.

As schematically illustrated in FIG. 2, a method 200 of driving range estimation DRE that uses an energy efficiency estimation EEE to adjust the driving range estimation DRE based on an input or measured torque $T_M$ when a vehicle 100 is initially shifted out of park is disclosed.

The method 200 starts at 210 and includes receiving 220, via a controller 30, a first signal $S_1$ indicating a shift of the vehicle 100 out of park; calculating 230, via the controller 30, a torque-to-acceleration ratio $TR_C$ of the vehicle 100 based on a measured acceleration $A_M$ of the vehicle 100 and a measured torque $T_M$ of the vehicle 100 when the vehicle 100 is shifted out of park and driving begins; comparing 240, via the controller 30, the calculated torque-to-acceleration ratio $TR_C$ at the measured acceleration $A_M$ to average torque-to-acceleration ratios $TR_{AVG}$ for the vehicle 100, which are stored within a memory 55 that is in communication with the controller 30.

While the memory 55 is schematically illustrated as being internal to the controller 30, it should be appreciated that the memory 55 may be external to the controller 30.

The method 200 further includes determining 250, via the controller, whether the calculated torque-to-acceleration ratio $TR_C$ is included in the average torque-to-acceleration ratios $TR_{AVG}$ stored in the memory 55; selecting 260, via the controller 30, an existing energy efficiency estimation EEEE associated with the calculated torque-to-acceleration ratio $TR_C$ when the calculated torque-to-acceleration ratio $TR_C$ is included in the average torque-to-acceleration ratios $TR_{AVG}$ stored in the memory 55; calculating 270, via the controller 30, a new energy efficiency estimation $EEE_N$ based on the average torque-to-acceleration ratios $TR_{AVG}$ closest to the calculated torque-to-acceleration ratio $TR_C$ when the calculated torque-to-acceleration ratio $TR_C$ is not included in the average torque-to-acceleration ratios $TR_{AVG}$ stored in the memory 55; determining 280, via the controller 30, the driving range estimation DRE based on one of the existing energy efficiency estimation EEEE and the new energy efficiency estimation $EEE_N$; updating 290, via the controller 30, the driving range estimation DRE displayed to a customer, e.g., a driver, while driving; and storing 315, via the controller 30, the new energy efficiency estimation $EEE_N$ calculated while driving within the memory 55.

Each of the average torque-to-acceleration ratios $TR_{AVG}$ includes a single torque-to-acceleration ratio $TR_{AVG}$ that is an average of a subset of measured torque-to-acceleration ratios $TR_{AVG}$ over a predefined period of time. Each of the average torque-to-acceleration ratios $TR_{AVG}$ is associated with an existing energy efficiency estimation $EEE_E$. Each of the average torque-to-acceleration ratios $TR_{AVG}$ and associated existing energy efficiency estimation $EEE_E$ are stored 315, for example, in a table within the memory 55 in communication with the controller 30.

The new energy efficiency estimation $EEE_N$ calculated is continuously updated while driving, and stored 315 within the memory 55 until a second signal $S_2$ indicating a shift into park is received 310 by the controller 30. When the second signal S2, which indicates that the vehicle 100 has been shifted into park, is received by the controller 30, the method 200 ends at 310.

Storing the new energy efficiency estimation $EEE_N$ includes associating 305 the calculated torque-to-acceleration ratio $TR_C$ with the calculated new energy efficiency estimation $EEE_N$, and storing 315 both in the table in the memory 55 in communication with the controller 30.

The driving range estimation DRE is determined based on the existing energy efficiency estimation $EEE_E$ selected when the calculated torque-to-acceleration ratio $TR_C$ is included in the average torque-to-acceleration ratios $TR_{AVG}$ for the vehicle 100, while the driving range estimation DRE is determined based on the new energy efficiency estimation $EEE_N$ calculated when the calculated torque-to-acceleration ratio $TR_C$ is not included in the average torque-to-acceleration ratios $TR_{AVG}$ for the vehicle 100.

According to one aspect of the disclosure, the average torque-to-acceleration ratios $TR_{AVG}$ is based on calibration data stored in the memory 55, and/or calculated based on historic drive cycle averages and stored in the memory 55.

The existing energy efficiency estimation $EEE_E$ may be selected from energy efficiency estimations EEEs stored in the memory 55, and/or associated with the average torque-to-acceleration ratios $TR_{AVG}$ stored in the memory 55.

According to one aspect of the disclosure, at least a first subset of the energy efficiency estimations EEEs may be based on calibration data.

The new energy efficiency estimation $EEE_N$ is associated 305 with the calculated torque-to-acceleration ratio $TR_C$, when the calculated torque-to-acceleration ratio $TR_C$ is not included in the average torque-to-acceleration ratios $TR_{AVG}$ stored in the memory 55. The new energy efficiency estimation $EEE_N$ and is stored 315 as one of the energy efficiency estimations EEEs.

The measured acceleration $A_M$ of the vehicle 100 is received from a first sensor $S_A$ of the plurality of sensors 50, in communication with the controller 30, while the measured torque $T_M$ is received from a second sensor $S_T$ of the plurality of sensors 50, in communication with the controller 30.

According to one aspect of the disclosure, a control system 60 for a vehicle 100 includes: a plurality of sensors 50, and a controller 30 in communication with the plurality of sensors 50.

The controller 30 is operable to receive 220 a first signal $S_1$ indicating a shift of the vehicle 100 out of park; calculate 230 a torque-to-acceleration ratio $TR_C$ of the vehicle 100 based on a measured acceleration $A_M$ of the vehicle 100 and a measured torque $T_M$ of the vehicle 100 when the vehicle 100 is shifted out of park and driving begins; compare 240 the calculated torque-to-acceleration ratio $TR_C$ at the measured acceleration $A_M$ to average torque-to-acceleration ratios $TR_{AVG}$ for the vehicle 100, wherein the average torque-to-acceleration ratios $TR_{AVG}$ are stored within a memory 55 that is in communication with the controller 30; determine 250 whether the calculated torque-to-acceleration ratio is $TR_C$ included in the average torque-to-acceleration ratios $TR_{AVG}$ stored in the memory 55; select 260 an existing energy efficiency estimation $EEE_E$ associated with the calculated torque-to-acceleration ratio $TR_C$ when the calculated torque-to-acceleration ratio $TR_C$ is included in the average torque-to-acceleration ratios $TR_{AVG}$ stored in the memory 55; calculate 270 a new energy efficiency estimation $EEE_N$ based on the average torque-to-acceleration ratios $TR_{AVG}$ closest to the calculated torque-to-acceleration ratio $TR_C$ when the calculated torque-to-acceleration ratio $TR_C$ is not included in the average torque-to-acceleration ratios $TR_{AVG}$ stored in the memory 55; determine 280 the driving range estimation DRE based on one of the existing energy efficiency estimation $EEE_E$ and the new energy efficiency estimation $EEE_N$; update 290 the driving range estimation DRE displayed to a customer while driving; and store 315 the new energy efficiency estimation $EEE_N$ calculated while driving within the memory 55.

According to one aspect of the disclosure, the new energy efficiency estimation $EEE_N$ calculated is continuously updated while driving, and stored within the memory 55 until a second signal $S_2$ indicating a shift into park is received 310 by the controller 30.

The driving range estimation DRE is determined 280 based on the existing energy efficiency estimation $EEE_E$ selected 260 when the calculated torque-to-acceleration ratio $TR_C$ is included in the average torque-to-acceleration ratios $TR_{AVG}$ for the vehicle 100, while the driving range estimation DRE is determined 280 based on the new energy efficiency estimation $EEE_N$ calculated 270 when the calculated torque-to-acceleration ratio $TR_C$ is not included in the average torque-to-acceleration ratios $TR_{AVG}$ for the vehicle 100.

The existing energy efficiency estimation $EEE_E$ may be selected from energy efficiency estimations EEEs stored in the memory 55 and may be associated with the average torque-to-acceleration ratios $TR_{AVG}$ stored in the memory 55.

According to one aspect of the disclosure, at least a first subset of the energy efficiency estimations EEEs is based on calibration data.

The new energy efficiency estimation $EEE_E$ is associated 305 with the calculated torque-to-acceleration ratio $TR_{AVG}$, when the calculated torque-to-acceleration ratio $TR_C$ is not included in the average torque-to-acceleration ratios $TR_{AVG}$ stored in the memory 55.

The new energy efficiency estimation $EEE_N$ is stored 315 as one of the energy efficiency estimations EEEs stored in the memory 55.

A vehicle 100 including a powertrain 12 configured to generate a torque T for propulsion of the vehicle 100; a plurality of sensors 50 configured to sense a shift, measure the torque T of the vehicle 100, and measure an acceleration AM of the vehicle; a display 40 configured to display information, for example but not limited to a driving range estimation DRE, to a customer, e.g., a driver, and a controller 30, in communication with the plurality of sensors 50 and the display 40.

The controller 30 is configured to receive 220 a first signal $S_1$ indicating a shift of the vehicle 100 out of park; calculate 230 a torque-to-acceleration ratio $TR_C$ of the vehicle 100 based on the measured acceleration $A_M$ of the vehicle 100 and a measured torque $T_M$ of the vehicle 100 when the vehicle 100 is shifted out of park and driving begins; compare 240 the calculated torque-to-acceleration ratio $TR_C$ at the measured acceleration $A_M$ to average torque-to-acceleration ratios $TR_{AVG}$ for the vehicle 100, wherein the average torque-to-acceleration ratios $TR_{AVG}$ are stored within a memory 55 that is in communication with the controller 30; determine 250 whether the calculated torque-to-acceleration ratio $TR_C$ is included in the average torque-to-acceleration ratios $TR_{AVG}$ stored in the memory 55; select 260 an existing energy efficiency estimation $EEE_E$ associated with the calculated torque-to-acceleration ratio $TR_C$ when the calculated torque-to-acceleration ratio $TR_C$ is included in the average torque-to-acceleration ratios $TR_{AVG}$ stored in the memory 55; calculate 270 a new energy efficiency estimation $EEE_N$ based on the average torque-to-acceleration ratios $TR_{AVG}$ closest to the calculated torque-to-acceleration ratio $TR_C$ when the calculated torque-to-acceleration ratio $TR_C$ is not included in the average torque-to-acceleration ratios $TR_{AVG}$ stored in the memory 55; determine 280 the driving range estimation DRE based on one of the existing energy efficiency estimation $EEE_E$ and the new energy efficiency estimation $EEE_N$; update 290 the driving range estimation DRE displayed to a customer while driving; and store 315 the new energy efficiency estimation $EEE_N$ calculated while driving within the memory 55.

The new energy efficiency estimation $EEE_N$ calculated is continuously updated while driving, and stored within the memory 55 until a second signal $S_2$ indicating a shift into park is received 310 by the controller 30.

The driving range estimation DRE is determined 280 based on the existing energy efficiency estimation $EEE_E$ selected when the calculated torque-to-acceleration ratio $TR_C$ is included in the average torque-to-acceleration ratios $TR_{AVG}$ for the vehicle 100, while the driving range estimation DRE is determined 280 based on the new energy efficiency estimation $EEE_N$ calculated 270 when the calculated torque-to-acceleration ratio $TR_C$ is not included in the average torque-to-acceleration ratios $TR_{AVG}$ for the vehicle 100.

The existing energy efficiency estimation $EEE_E$ is selected 260 from energy efficiency estimations EEEs stored in the memory 55, while the new energy efficiency estimation $EEE_N$ is associated 305 with the calculated torque-to-acceleration ratio $TR_C$, when the calculated torque-to-acceleration ratio $TR_C$ is not included in the average torque-to-acceleration ratios $TR_{AVG}$ stored in the memory 55.

The powertrain 12 may include, for example but not limited to, an internal combustion engine, and/or an electric propulsion system including, for example, an electric motor-generator.

By providing a method of driving range estimation that uses an energy efficiency estimation to adjust the driving range estimation based on a torque input when a vehicle is initially shifted out of park and driving begins, factors such as vehicle loading and/or unloading, whether or not the vehicle is pulling a trailer, and/or a weight of a load within the vehicle and/or the trailer can be accounted for resulting in the initial and subsequent driving range estimations being more accurate.

These and other attendant benefits of the present disclosure will be appreciated by those skilled in the art in view of the foregoing disclosure.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A method of driving range estimation for a vehicle, the method comprising:

receiving, via a controller, a first signal indicating a shift of the vehicle out of park;

calculating, via the controller, a torque-to-acceleration ratio of the vehicle based on a measured acceleration of the vehicle and a measured torque of the vehicle when the vehicle is shifted out of park and driving begins, wherein the measured torque of the vehicle is received from a torque sensor, and wherein the measured acceleration of the vehicle is received from a speed sensor;

comparing, via the controller, the calculated torque-to-acceleration ratio at the measured acceleration to average torque-to-acceleration ratios for the vehicle, wherein the average torque-to-acceleration ratios are stored within a memory that is in communication with the controller;

determining, via the controller, whether the calculated torque-to-acceleration ratio is included in the average torque-to-acceleration ratios stored in the memory;

selecting, via the controller, an existing energy efficiency estimation associated with the calculated torque-to-acceleration ratio when the calculated torque-to-acceleration ratio is included in the average torque-to-acceleration ratios stored in the memory;

calculating, via the controller, a new energy efficiency estimation based on the average torque-to-acceleration ratios closest to the calculated torque-to-acceleration ratio when the calculated torque-to-acceleration ratio is not included in the average torque-to-acceleration ratios stored in the memory;

determining, via the controller, the driving range estimation displayed to a customer via a display, wherein the driving range estimation is based on one of the existing energy efficiency estimation selected and the new energy efficiency estimation calculated, wherein the driving range estimation is determined based on the existing energy efficiency estimation selected when the calculated torque-to-acceleration ratio is included in the average torque-to-acceleration ratios for the vehicle, and wherein the driving range estimation is determined based on the new energy efficiency estimation calculated when the calculated torque-to-acceleration ratio is not included in the average torque-to-acceleration ratios for the vehicle;

updating, via the controller, the driving range estimation displayed to the customer via the display while driving; and storing, via the controller, the new energy efficiency estimation calculated while driving within the memory, wherein the new energy efficiency estimation calculated is continuously updated while driving, and stored within the memory until a second signal indicating a shift into park is received by the controller.

2. The method as recited in claim 1, wherein the average torque-to-acceleration ratios are based on calibration data stored in the memory.

3. The method as recited in claim 1, wherein the average torque-to-acceleration ratios are calculated based on historic drive cycle averages and stored in the memory.

4. The method as recited in claim 1, wherein the existing energy efficiency estimation is selected from energy efficiency estimations stored in the memory.

5. The method as recited in claim 4, wherein the energy efficiency estimations are associated with the average torque-to-acceleration ratios stored in the memory.

6. The method as recited in claim 4, wherein at least a first subset of the energy efficiency estimations is based on calibration data.

7. The method as recited in claim 1, wherein the new energy efficiency estimation is associated with the calculated torque-to-acceleration ratio, when the calculated torque-to-acceleration ratio is not included in the average torque-to-acceleration ratios stored in the memory.

8. The method as recited in claim 7, wherein the new energy efficiency estimation is stored as one of the energy efficiency estimations.

9. The method as recited in claim 1, wherein the acceleration of the vehicle is received from a first sensor of a plurality of sensors, in communication with the controller.

10. The method as recited in claim 1, wherein the torque is received from a second sensor of a plurality of sensors, in communication with the controller.

11. A control system for a vehicle, the control system comprising:

a plurality of sensors including a torque sensor, and a speed sensor;

a controller in communication with the plurality of sensors, wherein the controller is operable to:

receive a first signal indicating a shift of the vehicle out of park;

calculate a torque-to-acceleration ratio of the vehicle based on a measured acceleration of the vehicle and a measured torque of the vehicle when the vehicle is shifted out of park and driving begins, wherein the measured torque of the vehicle is received from the torque sensor, and wherein the measured acceleration of the vehicle is received from the speed sensor;

compare the calculated torque-to-acceleration ratio at the measured acceleration to average torque-to-acceleration ratios for the vehicle, wherein the average torque-to-acceleration ratios are stored within a memory that is in communication with the controller;

determine whether the calculated torque-to-acceleration ratio is included in the average torque-to-acceleration ratios stored in the memory;

select an existing energy efficiency estimation associated with the calculated torque-to-acceleration ratio when the calculated torque-to-acceleration ratio is included in the average torque-to-acceleration ratios stored in the memory;

calculate a new energy efficiency estimation based on the average torque-to-acceleration ratios closest to the calculated torque-to-acceleration ratio when the calculated torque-to-acceleration ratio is not included in the average torque-to-acceleration ratios stored in the memory;

determine a driving range estimation displayed to a customer via a display, wherein the driving range estimation displayed is based on one of the existing energy efficiency estimation selected and the new energy efficiency estimation calculated, wherein the driving range estimation is determined based on the existing energy efficiency estimation selected when the calculated torque-to-acceleration ratio is included in the average torque-to-acceleration ratios for the vehicle, and wherein the driving range estimation is determined based on the new energy efficiency estimation calculated when the calculated torque-to-acceleration ratio is not included in the average torque-to-acceleration ratios for the vehicle;

update the driving range estimation displayed to the customer via a display while driving; and store the new energy efficiency estimation calculated while driving within the memory, wherein the new energy efficiency calculated is continuously updated while driving, and stored within the memory until a second signal indicating a shift into park is received by the controller.

12. The control system as recited in claim 11, wherein the existing energy efficiency estimation is selected from energy efficiency estimations stored in the memory.

13. The control system as recited in claim 12, wherein the energy efficiency estimations are associated with the average torque-to-acceleration ratios stored in the memory.

14. The control system as recited in claim 12, wherein at least a first subset of the energy efficiency estimations is based on calibration data.

15. The control system as recited in claim 11, wherein the new energy efficiency estimation is associated with the calculated torque-to-acceleration ratio, when the calculated torque-to-acceleration ratio is not included in the average torque-to-acceleration ratios stored in the memory.

16. The control system as recited in claim 15, wherein the new energy efficiency estimation is stored as one of the energy efficiency estimations.

17. A vehicle comprising:

a powertrain configured to generate a torque for propulsion of the vehicle;

a plurality of sensors configured to sense a shift, measure the torque of the vehicle, and measure an acceleration of the vehicle, wherein the plurality of sensors includes a torque sensor, and a speed sensor;

a display configured to display information to a driver, wherein the information includes a driving range estimation;

a controller, in communication with the plurality of sensors and the display, wherein the controller is configured to:

receive a first signal indicating a shift of the vehicle out of park;

calculate a torque-to-acceleration ratio of the vehicle based on a measured acceleration of the vehicle and a measured torque of the vehicle when the vehicle is shifted out of park and driving begins, wherein the measured torque of the vehicle is received from the torque sensor, and wherein the measured acceleration of the vehicle is received from the speed sensor;

compare the calculated torque-to-acceleration ratio at the measured acceleration to average torque-to-acceleration ratios for the vehicle, wherein the average torque-to-acceleration ratios are stored within a memory that is in communication with the controller;

determine whether the calculated torque-to-acceleration ratio is included in the average torque-to-acceleration ratios stored in the memory;

select an existing energy efficiency estimation associated with the calculated torque-to-acceleration ratio when the calculated torque-to-acceleration ratio is included in the average torque-to-acceleration ratios stored in the memory;

calculate a new energy efficiency estimation based on the average torque-to-acceleration ratios closest to the calculated torque-to-acceleration ratio when the calculated torque-to-acceleration ratio is not included in the average torque-to-acceleration ratios stored in the memory;

determine the driving range estimation displayed to the driver via the display, based on one of the existing energy efficiency estimation selected and the new energy efficiency estimation calculated, wherein the driving range estimation displayed to the driver via the display, is determined based on the existing energy efficiency estimation selected when the calculated torque-to-acceleration ratio is included in the average torque-to-acceleration ratios for the vehicle, and wherein the driving range estimation is determined based on the new energy efficiency estimation calculated when the calculated torque-to-acceleration ratio is not included in the average torque-to-acceleration ratios for the vehicle;

update the driving range estimation displayed to a customer while driving; and store the new energy efficiency estimation calculated while driving within the memory, wherein the new energy efficiency estimation calculated is continuously updated while driving, and stored within the memory until a second signal indicating a shift into park is received by the controller.

18. The vehicle as recited in claim 17, wherein the existing energy efficiency estimation is selected from energy efficiency estimations stored in the memory, and wherein the new energy efficiency estimation is associated with the calculated torque-to-acceleration ratio, when the calculated torque-to-acceleration ratio is not included in the average torque-to-acceleration ratios stored in the memory.

19. The vehicle as recited in claim 17, wherein the powertrain includes an internal combustion engine.

20. The vehicle as recited in claim 17, wherein the powertrain includes an electric propulsion system.

* * * * *